(12) United States Patent
Petersen

(10) Patent No.: US 7,669,832 B2
(45) Date of Patent: Mar. 2, 2010

(54) SOLENOID ACTUATED VALVE WITH A DAMPING DEVICE

(75) Inventor: Hans Kurt Petersen, Kolding (DK)

(73) Assignee: Danfoss A/S, Nordborg (DK)

( * ) Notice: Subject to any disclaimer, the term of this patent is extended or adjusted under 35 U.S.C. 154(b) by 50 days.

(21) Appl. No.: 11/662,164

(22) PCT Filed: Sep. 9, 2005

(86) PCT No.: PCT/DK2005/000574

§ 371 (c)(1),
(2), (4) Date: Mar. 7, 2007

(87) PCT Pub. No.: WO2006/026996

PCT Pub. Date: Mar. 16, 2006

(65) Prior Publication Data

US 2008/0067461 A1 Mar. 20, 2008

(30) Foreign Application Priority Data

Sep. 10, 2004 (DK) ................................ 2004 01373

(51) Int. Cl.
*F16K 31/02* (2006.01)
(52) U.S. Cl. ........................ 251/129.15; 251/12; 251/54
(58) Field of Classification Search .................. 251/48, 251/54, 12, 129.15
See application file for complete search history.

(56) References Cited

U.S. PATENT DOCUMENTS

| 276,805 | A | 5/1883 | Guild |
| 2,522,991 | A | 9/1950 | Caserta |
| 2,524,293 | A | 10/1950 | Lindstrom |
| 2,630,139 | A | 3/1953 | Nagel |
| 2,735,047 | A | 2/1956 | Garner et al. ............... 317/186 |
| 2,827,923 | A | 3/1958 | Sadler ......................... 137/589 |
| 2,968,464 | A | 1/1961 | Olson ............................ 251/30 |
| 3,134,932 | A | 5/1964 | Ray ............................ 317/185 |

(Continued)

FOREIGN PATENT DOCUMENTS

DE 1 791 448 7/1956

(Continued)

OTHER PUBLICATIONS

International Search Report of PCT/DK2005/000574 Dated Nov. 17, 2005.

(Continued)

*Primary Examiner*—John K Fristoe, Jr.
(74) *Attorney, Agent, or Firm*—McCormick, Paulding & Huber LLP

(57) ABSTRACT

The invention provides a solenoid actuated valve with a plunger which moves in a sleeve under influence of a magnetic field from the solenoid and further comprising a damping device for reducing noise and wear caused by the plunger when it bounces against a top part located in the sleeve. The damping device comprises a first part which forms the limit of the travel of the plunger and another part which is allowed to move relative to the first part in a dampened movement. To enable application in a vacuum system, the damping device comprises a conduit which allows evacuation of a chamber confined between one end of the sleeve and the damping device. The invention further provides a damper for a solenoid actuated valve.

9 Claims, 5 Drawing Sheets

U.S. PATENT DOCUMENTS

| | | | | |
|---|---|---|---|---|
| 3,326,511 A | * | 6/1967 | Hallgreen | 251/54 |
| 3,345,079 A | | 10/1967 | Wickham | |
| 3,796,611 A | | 3/1974 | O'Brien | 148/23 |
| 3,797,611 A | | 3/1974 | Hurt | 188/71.8 |
| 4,335,690 A | | 6/1982 | Hosokawa et al. | |
| 4,437,644 A | | 3/1984 | Wilmers | 251/11 |
| 4,501,409 A | | 2/1985 | Hill et al. | |
| 4,515,343 A | * | 5/1985 | Pischinger et al. | 251/48 |
| 4,588,175 A | | 5/1986 | Martin et al. | 267/155 |
| 5,186,151 A | * | 2/1993 | Schwerdt et al. | 123/506 |
| 5,300,908 A | | 4/1994 | Stone et al. | 335/256 |
| 5,575,460 A | | 11/1996 | Knöpel | 267/91 |
| 5,722,633 A | * | 3/1998 | Goossens et al. | 251/129.15 |
| 5,881,993 A | * | 3/1999 | Wilson et al. | 251/40 |
| 5,909,791 A | | 6/1999 | DiStefano | 192/223.4 |
| 6,205,964 B1 | | 3/2001 | Maisch et al. | 123/90.11 |
| 6,220,586 B1 | | 4/2001 | Pavlin et al. | 267/155 |
| 2002/0074532 A1 | | 6/2002 | Rovira et al. | 251/129.21 |
| 2003/0034599 A1 | | 2/2003 | Devambe | 267/166 |
| 2003/0132409 A1 | | 7/2003 | Birkelund | 251/30.04 |

FOREIGN PATENT DOCUMENTS

| | | |
|---|---|---|
| DE | 1 980 806 | 3/1968 |
| DE | 196 00 351 A1 | 7/1997 |
| DE | 298 05 576 U1 | 7/1999 |
| DE | 19937488 A1 | 2/2001 |
| DE | 100 16 600 A1 | 5/2001 |
| EP | 0 300 407 A1 | 1/1989 |

OTHER PUBLICATIONS

International Search Report PCT/DK2005/000575 Dated Nov. 21, 2005.

U.S. Appl. No. 11/662,158 entitled "A Spring and a Valve Incorporating Such a Spring" filed Mar. 7, 2007 in the name of Hans Kurt Petersen.

* cited by examiner

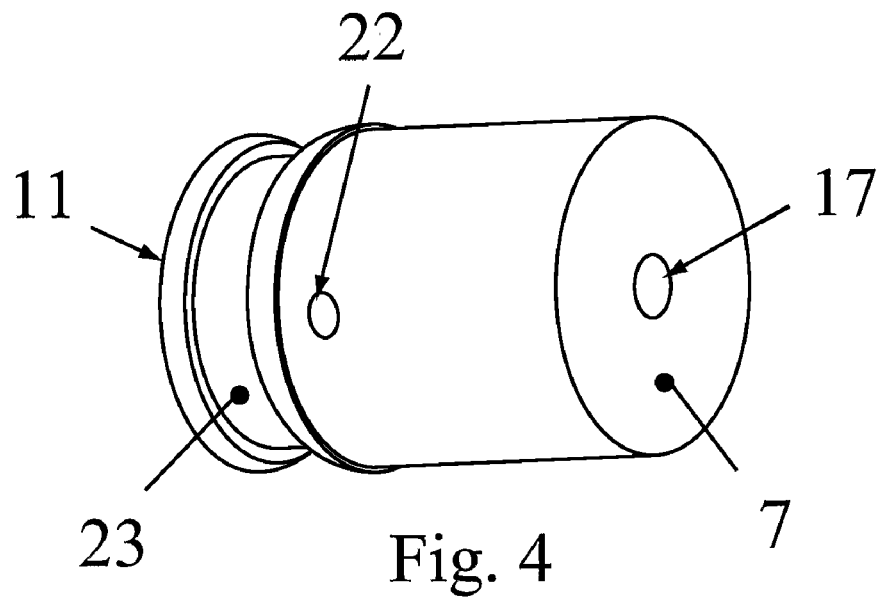
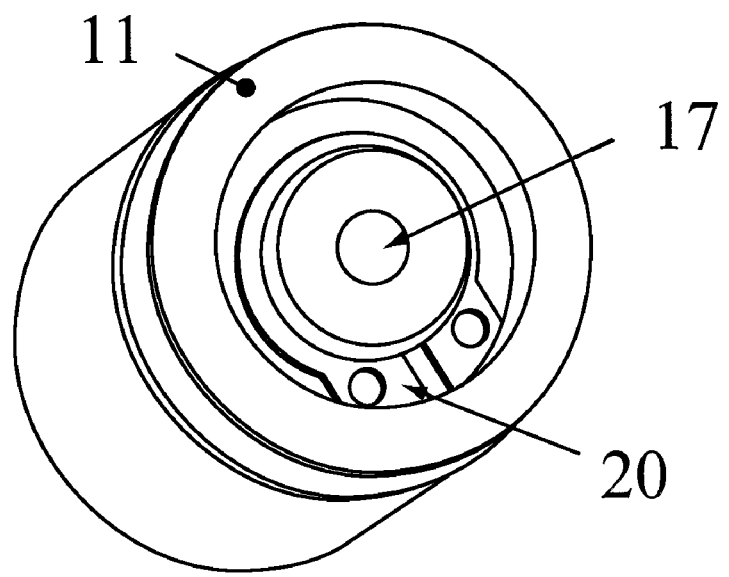

SOLENOID ACTUATED VALVE WITH A DAMPING DEVICE

CROSS REFERENCE TO RELATED APPLICATIONS

This application is entitled to the benefit of and incorporates by reference essential subject matter disclosed in International Patent Application No. PCT/DK2005/000574 filed on Sep. 9, 2005 and Danish Patent Application No. PA 2004 01373 filed Sep. 10, 2004.

FIELD OF THE INVENTION

The invention relates to solenoid actuated valve with a damping device to reduce noise, wear, strain or breakage of a plunger guide sleeve for a solenoid actuated valve. In particular, the invention relates to a solenoid actuated valve comprising a plunger guide sleeve, a plunger movably arranged in the sleeve, and a damping device located in the sleeve to separate a first compartment of the sleeve from a second compartment of the sleeve. The damping device comprises a first part being attached in the sleeve, a second part joined to the first part in a connection allowing the second part to move relative to the first part, and an elastically deformable member arranged between the first and second parts to dampen movement of the parts relative to each other.

BACKGROUND OF THE INVENTION

Solenoids are widely applied for actuation of valves and other mechanical constructions. In a conventional solenoid actuated valve, gravity or a spring is located to bias a closure member against its closed or open position, typically to define a "normally closed" valve. A plunger made from a magnetic material is arranged to move back and forth in a sleeve to operate the closure member against the force from gravity or from the spring and thereby to shift the closure member from its position of rest. The plunger is actuated magnetically via the solenoid which is energised by an electrical current. The travel of the plunger is normally limited in one direction by the closure member and in the opposite direction by a top part of a ferromagnetic material, e.g. an iron core, which is located adjacent the top of the sleeve. The solenoid normally includes a yoke which is located adjacent the top part to form a substantially uninterrupted path for the magnetic flux from the yoke into the top part to improve the force of attraction. In operation, the plunger receives considerable kinetic energy which is discharged when the plunger collides with the top part. As a result, noise, excessive wear or even breakage of the sleeve is sometimes experienced.

To alleviate the impact of the plunger against the top part, valves have been disclosed with an impact absorbing stop member located in the sleeve. In DE 100 16 600, a spring element is inserted between a top part of the sleeve and the plunger to reduce noise from the impact. In this design, the spring creates an air-gap between the top part of the sleeve and plunger. The air-gap forms a non-magnetic media which interrupts the path of the magnetic flux between the top part and the plunger and thereby reduces the attracting force. In U.S. Pat. No. 2,735,047, a plunger is energized by a coil whereby it moves rapidly upwardly. After an initial free movement, the plunger strikes a stop member in which the impact is absorbed in a sponge rubber element. Also in this design, a gap of a non-magnetic media, i.e. the rubber element, is created, and therefore also this design is inappropriate with respect to the desire of establishing a strong force of attraction between the top part and the plunger.

In EP 0 300 407, a fixed iron core is divided into an end-surface member which is contacted by a movable iron core and a body member. An elastic member is inserted between the end-surface member and the body member to suppress noise. The elastic member is inserted between the end-surface member and the body member in such a disposition that it is not across the magnetic flux. In this attempt to alleviate the impact between a movable plunger and adjacent elements without interrupting the path of the magnetic flux, the damper has, however, become inapplicable e.g. for vacuum systems or high vacuum systems wherein evacuation of the valve is required. It is therefore an object of the invention to embody a solenoid actuated valve such that the plunger can operate at a reduced noise level, has a long service life, and such that it is applicable e.g. in combination with a vacuum system.

SUMMARY OF THE INVENTION

The object is solved by a valve of the kind described in the introduction, and wherein the second part comprises a conduit for fluid communication between the first and second compartments.

Since the first and second compartments are in fluid communication, evacuation of the compartments has been facilitated, e.g. for use in a vacuum system.

When the solenoid is operated, a strong force of attraction should be created between the plunger and the second part of the damper. In order to provide a strong field, the second part could preferably be made from a magnetically conductive material thereby to form path for the magnetic flux from the solenoid. The intention with the force of attraction is to lift the plunger, and not to lower the second part. The damper is therefore, though being axially extendable by movement of the second part in relation to the first part, limited not to exceed a longest length wherein further axial extension is impossible.

In order to guide the movement of the second part relative to the first part, one of the first and second parts may be located at least partly in a bore of the other one of the first and second part.

The valve may be associated with, or form as an integral part, a solenoid with a yoke. In order to improve the force of attraction, it is an advantage to arrange the yoke adjacent the first or second part whereby the first or second part can cooperate with the yoke to form a substantially uninterrupted path for the magnetic flux from the yoke to at least one of the first and the second part. An opposite end of the yoke can be located adjacent the plunger, thereby creating a dosed loop extending through the yoke and through the plunger and the second part. In this arrangement, the first part may also be made from a magnetically conductive material and form path for the flux in the loop.

The elastically deformable member may comprise a resilient polymeric material or a spring, e.g. a spring made from a metallic material, e.g. a disc spring. In particular, the elastically deformable member may be constituted by an O-ring. In that respect, a preferred material converts during deformation as much of the energy as possible to internal resistance, e.g. to heat, and as little energy as possible to recoil. For that purpose, the elastically deformable member could e.g. be made from a fluoro elastomer, FKM or from similar polymeric materials. To enable evacuation of the area around the elastically deformable member, the member could be located in a space between the first and the second parts, the space being in fluid communication with the conduit or in fluid communication with one of the first and second compartments.

In a second aspect, the invention relates to a damping device for a solenoid actuated valve, the damping device comprising:
a first part,
a second part joined to the first part in a connection allowing the second part to move relative to the first part, and
an elastically deformable member arranged between the first and second parts to dampen movement of the parts relative to each other,
characterised in that the damping device comprises a conduit extending through the first and the second parts.

The damping device according to the second aspect may have any of the features described in relation to the first aspect. In particular, the elastically deformable member may be located in a space being in fluid communication with the conduit or in fluid communication with

BRIEF DESCRIPTION OF THE DRAWINGS

In the following, a preferred embodiment of the invention will be described in further details with reference to the drawing in which.

DETAILED DESCRIPTION OF THE INVENTION

Figure 1:
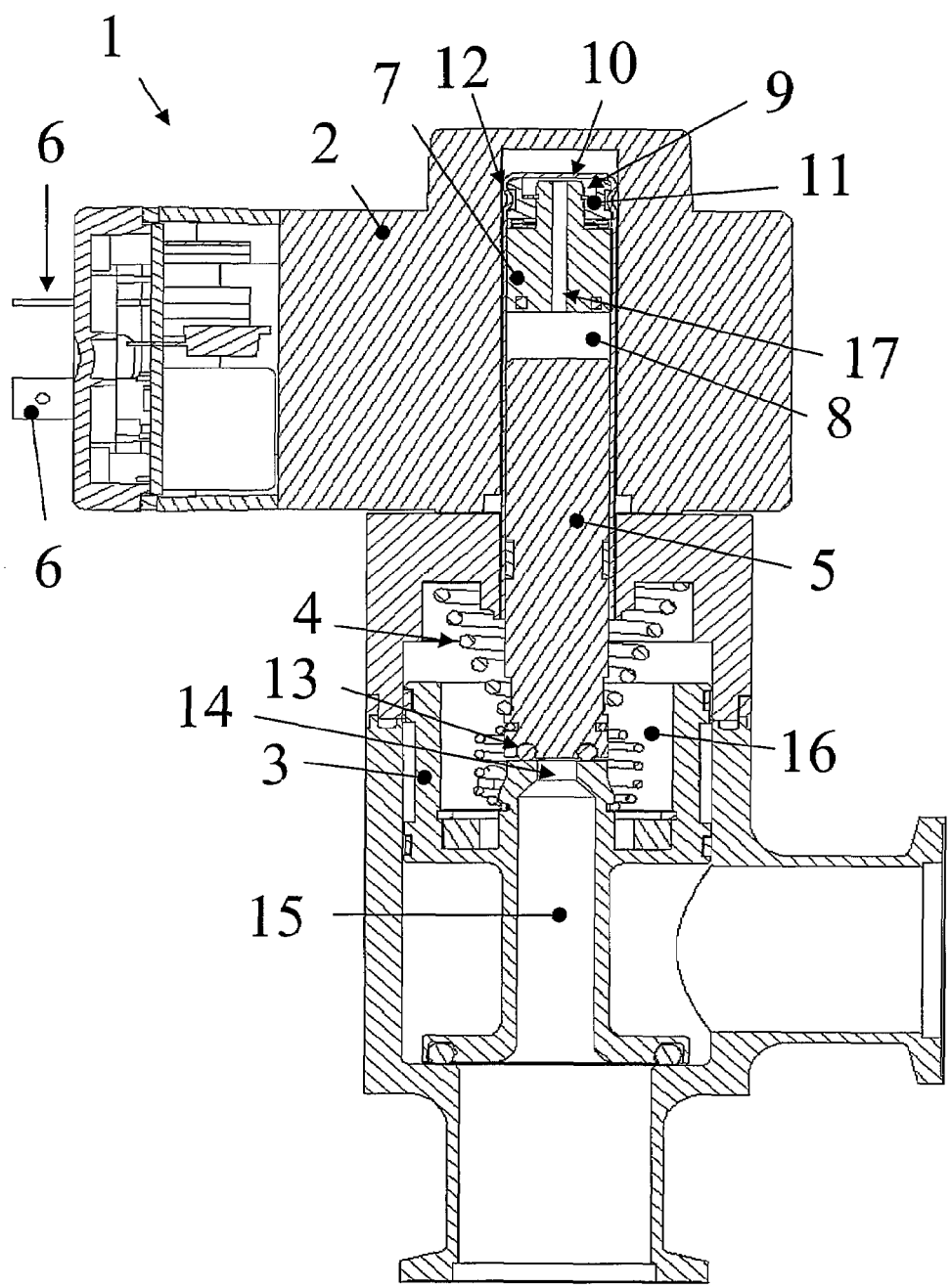
FIG. 1 shows a solenoid actuated valve with a damping device.

FIG. 1 shows a valve 1 for a high vacuum system and comprising a solenoid 2 applied to operate on the closure member 3 against the force from the spring 4 to shift the closure member from its dosed position of rest. To move the closure member, the valve comprises a plunger 5 which is actuated magnetically via the solenoid. The solenoid is energised by an electrical current via the connectors 6. The travel of the plunger is limited in one direction by the closure member and in the opposite direction by a second part 7 of the damping device. The damping device is located in a sleeve to separate a first compartment 8 of the sleeve from a second compartment 9 of the sleeve. The second compartment is sealed upwardly by the end part 10 of the sleeve. The damping device, which is shown in further details in FIG. 2, further comprises a first part 11 being attached in the sleeve by a bead of the sleeve which engages a circumferentially extending recess 12 in the first part. The first part is joined to the second part in a connection allowing the second part to move relative to the first part. The damper further comprises an elastically deformable member 18, cf. FIG. 2, arranged between the first and second parts to dampen movement of the parts relative to each other. The solenoid includes a yoke (not shown) which is located adjacent one of the first and the second parts to form a path for the magnetic flux from the yoke into the first part. The path is substantially uninterrupted apart from small air gaps or apart from the wall thickness of the sleeve, which sleeve could be made from an austenitic material or from similar none magnetic material. The second part is arranged to form an uninterrupted flux path to the plunger, when the plunger abuts the second part. The uninterrupted flux improves the force of attraction between the plunger and the damping device, when the solenoid is operated. In operation, the plunger moves with a considerable speed towards the damping device, and when it strikes the second part of the damping device, the impact is alleviated by the elastically deformable member as the first part moves towards the second part. As a result, noise, wear or breakage can be reduced or avoided. The disclosed valve is a servo valve, wherein the movement of the plunger opens a passage 15 into a control chamber 16, whereby the valve opens. The damping device further comprises a conduit 17 for fluid communication between the first and second compartments. As a result, the second chamber can be evacuated through the first chamber which makes the valve applicable in vacuum systems. The valve disclosed in FIG. 1 is a servo valve, wherein a pilot passage is 14 is sealed off by a resilient gasket 13 attached to the plunger.

Figure 2:
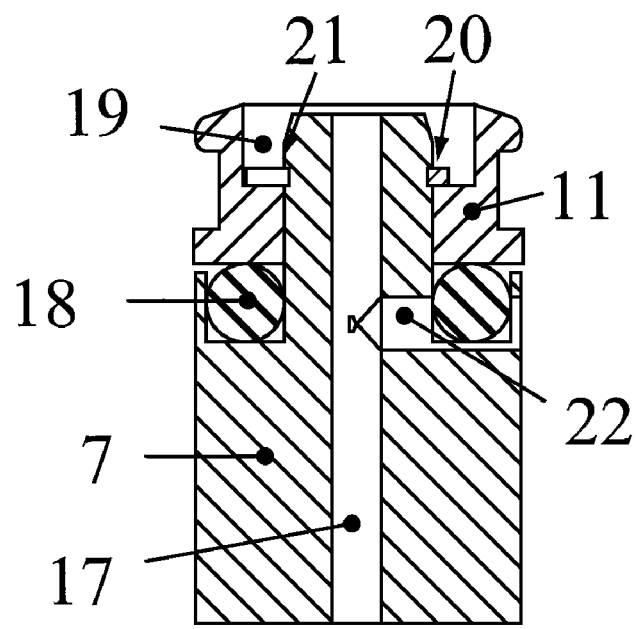
FIG. 2 shows an enlarged, cross-sectional view of the damping device in FIG. 1.

FIG. 2 shows a more detailed cross-sectional view of the damping device, wherein it is more clearly seen that the movement of the first part relative to the second part is dampened by the O-ring 18. As shown, the first part has a bore 19, in which the second part is located. The parts are joined by the locking ring 20 which engages a recess 21 of the second part at a location whereby the second part is allowed to move relative to the first part. Due to the design of second part extending through the first part and being locked by a locking ring, the damper is axially extendable by movement of the second part in relation to the first part between a first position providing a shortest length, and a second position providing a longest length wherein further axial extension is impossible due to the locking ring.

The second part forms a groove in which the O-ring 18 is located. The groove is in fluid communication with the conduit via the channel 22 to ensure evacuation of the area between the first and second parts.

Figure 3:
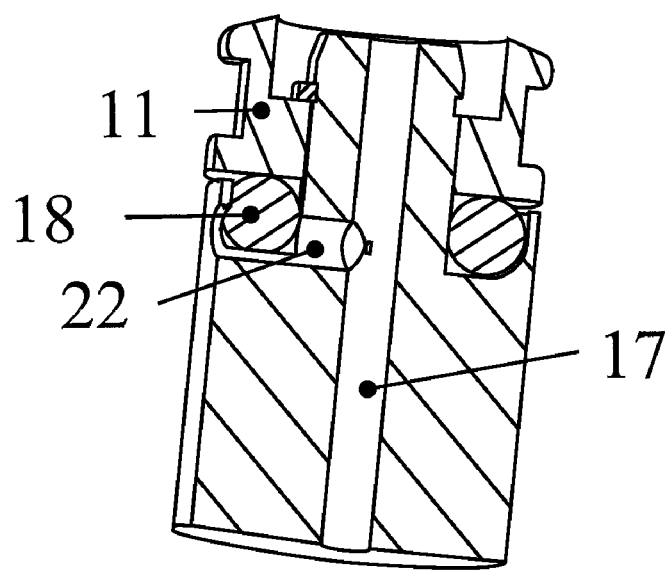
FIG. 3 shows a cross-sectional, perspective view of a solid model of the damping device in FIG. 2, FIGS. 4 and 5 show a perspective view of a solid model of the damping device in FIG. 2 in different orientations.

FIGS. 3-5 shows different views of solid models of the damping device to more clearly show the design. In particular, FIGS. 3 and 4 shows a recess 23 formed in the first part to enable fixation to a sleeve by forming a bead in the sleeve, which engages the recess.

Figure 6:
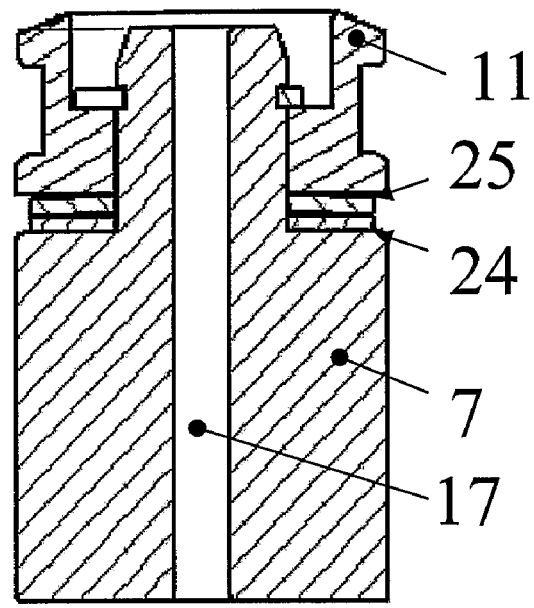
FIG. 6 shows a cross-sectional view of a damping device with a set of disc springs.

FIG. 6 shows an embodiment of the damping device wherein the elastically deformable member is constituted by a pair of two disc springs 24, 25 adjacently arranged to provide a desired damping characteristic. Depending upon the desired characteristic, the elastically deformable member could be constituted by one, two, three or more disc springs or even by a helical spring or by a flat spring.

Figure 7:
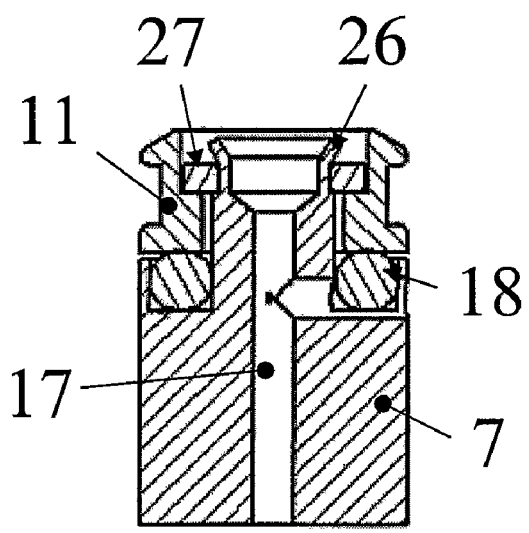
FIG. 7 shows a cross-sectional view of a damping device similar to the one in FIG. 2, but with a different joining of the device parts.

FIG. 7 shows an alternative way of locking the second part to the first part, wherein the second part has a radially expanded portion 26 supporting the locking ring 27 to lock the second part and the first part to allow movement of the second part between two extreme positions relative to the first part.

Figure 8:
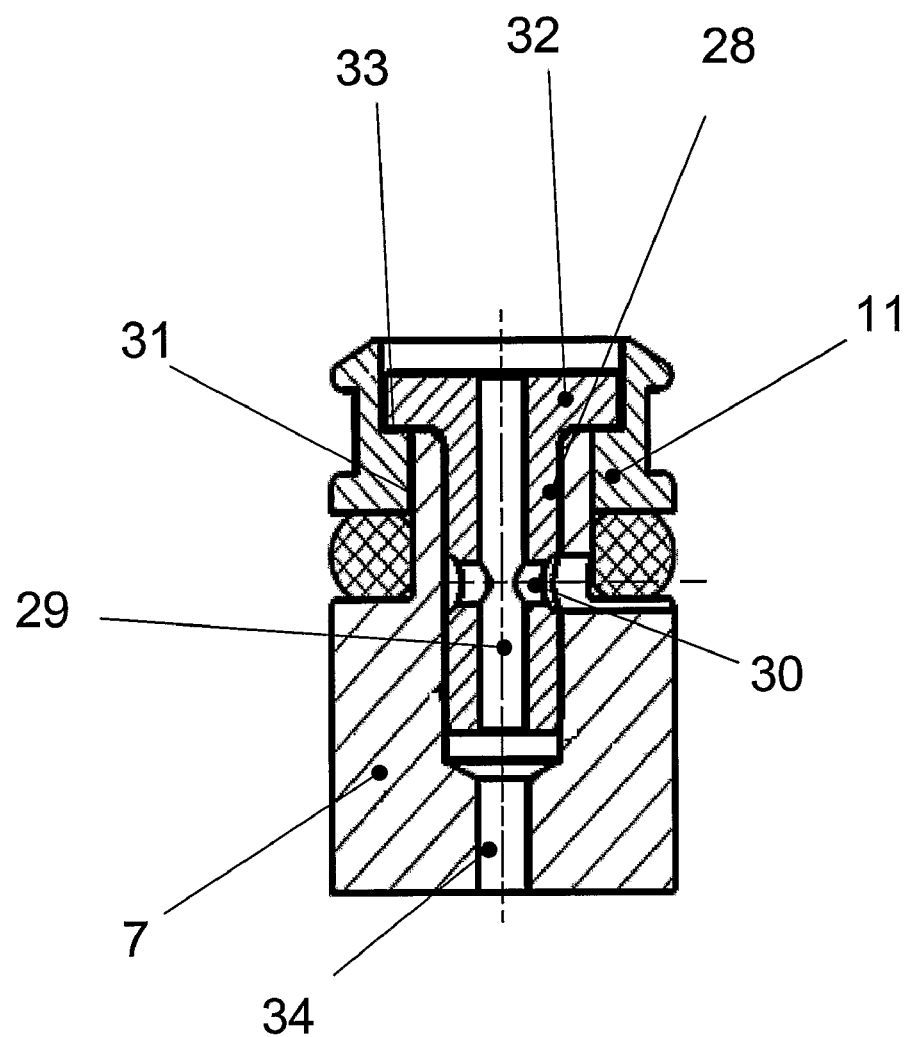
FIG. 8 shows a cross-sectional view of a damping device with yet another joining of the parts.

FIG. 8 shows yet another way of joining the first part and the second part, while allowing relative motion between the parts. In this embodiment the parts are joined by a pin 28 provided with a head 32 and having a longitudinal bore 29 connected to a cross channel 30. The pin is fixated to the second part by press fitting into a bore 31 in the second part, while the head in the above mentioned second position of the second part, seats on a shoulder 33 formed in the first part, whereby it limits the motion of the first part relative to the second part. The pin could be replaced by a screw or similar fastening means. The bore 31 is formed in continuation of a passage 34 also present in the second part. The bore 29 in combination with the passage 34 serves the same purpose as the conduit 17, namely allowing fluid communication between the first and second chamber. The cross channel 30 corresponds to the channel 22.

While the present invention has been illustrated and described with respect to a particular embodiment thereof, it should be appreciated by those of ordinary skill in the art that various modifications to this invention may be made without departing from the spirit and scope of the present invention.

What is claimed:

1. A solenoid actuated valve comprising a plunger guide sleeve, a plunger movably arranged in the sleeve under influence of a magnetic flux generated by an associated solenoid, and a damping device located in the sleeve to separate a first compartment of the sleeve from a second compartment of the sleeve, the damping device comprising:
   a first part attached in the sleeve,
   a second part joined to the first part in a connection allowing the second part to move relative to the first part, and
   an elastically deformable member arranged between the first and second parts to dampen movement of the parts relative to each other,
   wherein the damping device comprises a conduit for fluid communication between the first and second compartments, and
   wherein the second part is joined to the first part by fastening means partly arranged in a bore formed in the second part and having a longitudinal bore forming part of the conduit.

2. The solenoid actuated valve according to claim 1, wherein the connection limits movement of the second part relative to the first part between a first and a second extreme position.

3. The solenoid actuated valve according to claim 1, wherein the second part is located partly in a bore in the first part.

4. The solenoid actuated valve according to claim 1, wherein the second part forms a path for the magnetic flux.

5. The solenoid actuated valve according to claim 1, further comprising a solenoid with a yoke wherein at least one of the first and second parts cooperates with the yoke to form a substantially uninterrupted path for the magnetic flux from the yoke to the first and/or second part.

6. The solenoid actuated valve according to claim 1, wherein the elastically deformable member comprises a resilient polymeric material.

7. The solenoid actuated valve according to claim 1, wherein the elastically deformable member comprises a spring.

8. The solenoid actuated valve according to claim 1, wherein the second part extends through the first part and wherein a portion of the conduit is formed in the second part.

9. The solenoid actuated valve according to claim 1, wherein the elastically deformable member is located in a space between the first and the second parts, the space being in fluid communication with at least one of the conduit, the first compartment and the second compartment.

* * * * *